United States Patent
Lee et al.

(10) Patent No.: US 9,188,732 B2
(45) Date of Patent: Nov. 17, 2015

(54) DISPLAY DEVICE AND METHOD FOR FABRICATING REFLECTIVE SHEET FOR THE SAME

(71) Applicant: LG Display Co., Ltd., Seoul (KR)

(72) Inventors: Sang-Hyun Lee, Gyeonggi-do (KR); Byoung-Ku Kim, Gyeonggi-do (KR); Won-Taek Moon, Gyeonggi-do (KR); Bo-Ra Kim, Gyeonggi-do (KR); Su-Jin Chang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 14/096,014

(22) Filed: Dec. 4, 2013

(65) Prior Publication Data

US 2014/0169036 A1  Jun. 19, 2014

(30) Foreign Application Priority Data

Dec. 14, 2012 (KR) .................. 10-2012-0146893
Aug. 8, 2013 (KR) .................. 10-2013-0094372

(51) Int. Cl.
*F21V 8/00* (2006.01)
*G02B 1/10* (2015.01)
(Continued)

(52) U.S. Cl.
CPC .............. *G02B 6/0088* (2013.01); *G02B 1/105* (2013.01); *G02B 1/118* (2013.01); *G02B 6/0055* (2013.01); *G02B 6/0065* (2013.01); *F21V 7/10* (2013.01); *Y10T 29/49826* (2015.01)

(58) Field of Classification Search
CPC .... G02B 6/0065; G02B 1/118; G02B 6/0088; G02B 1/105; G02B 6/0055; G02B 5/0816; G02B 5/0808; Y10T 29/49826; F21V 7/00; F21V 7/048; F21V 7/10; F21V 7/22; G02F 1/133617; G02F 1/133605
See application file for complete search history.

(56) References Cited

U.S. PATENT DOCUMENTS 5,620,775 A  4/1997  LaPerre
5,991,080 A * 11/1999  Kohta et al. .................. 359/584
(Continued)

FOREIGN PATENT DOCUMENTS

CN  1869788 A   11/2006
EP  1241402 A1   9/2002
(Continued)

OTHER PUBLICATIONS

Office Action dated Nov. 27, 2014, issued by the Japanese Patent Office in Japanese Patent Application No. 2013-210990.
(Continued)

*Primary Examiner* — Bao Q Truong
(74) *Attorney, Agent, or Firm* — Morgan, Lewis & Bockius LLP (57) ABSTRACT

A display device and a method of fabricating a reflective sheet for the same are provided. The display device includes: a display panel to display an image, a plurality of light emitting diodes (LEDs) to: generate and supply light to the display panel, a light guide plate to guide the light to the display panel, and a reflective sheet to reflect light toward a cover bottom below the LEDs toward the light guide plate, the reflective sheet including: a reflective layer, first and second skin layers respectively on upper and lower portions of the reflective layer, the first and second skin layers each including an embossing surface including a plurality of first reflective patterns to: prevent adhesion between the reflective layer and the light guide plate, and increase efficiency of light, and the reflective layer including a plurality of second reflective patterns, each including a filler in an air layer.

12 Claims, 10 Drawing Sheets

(51) Int. Cl.
*G02B 1/118* (2015.01)
*F21V 7/10* (2006.01)

(56) References Cited

U.S. PATENT DOCUMENTS

| | | | |
|---|---|---|---|
| 6,268,961 | B1 | 7/2001 | Nevitt et al. |
| 6,943,855 | B2 * | 9/2005 | Nakano ............... 349/65 |
| 7,064,741 | B2 * | 6/2006 | Katsu et al. ............. 345/102 |
| 8,746,905 | B2 * | 6/2014 | Chang et al. ............ 359/883 |
| 2002/0187284 | A1 | 12/2002 | Kinoshita et al. |
| 2006/0209404 | A1 | 9/2006 | Kim et al. |
| 2006/0209416 | A1 | 9/2006 | Kim et al. |
| 2010/0143702 | A1 | 6/2010 | Im et al. |
| 2010/0315576 | A1 | 12/2010 | Chung et al. |
| 2013/0314796 | A1 * | 11/2013 | Hitomi et al. .......... 359/599 |

FOREIGN PATENT DOCUMENTS

| | | |
|---|---|---|
| JP | H07-209641 A | 8/1995 |
| JP | H08-146207 A | 6/1996 |
| JP | H11-514943 A | 12/1999 |
| JP | 2000-275410 A | 10/2000 |
| JP | 2004-101601 A | 4/2004 |
| JP | 2006-259736 A | 9/2006 |
| JP | 2006-264336 A | 10/2006 |
| JP | 2008-266087 A | 11/2008 |
| JP | 2010-527045 A | 8/2010 |
| JP | 2010-286834 A | 12/2010 |
| TW | I312428 B | 7/2009 |
| TW | 201232057 A | 8/2012 |
| WO | 01/22129 A1 | 3/2001 |
| WO | 2008/140282 A2 | 11/2008 |

OTHER PUBLICATIONS

Office Action dated Jul. 31, 2014, issued by the Japanese Patent Office in Japanese Patent Application No. 2013-210990.

Office Action dated Sep. 23, 2014, issued by the Taiwan Intellectual Property Office in Taiwanese Patent Application No. 102135861.

* cited by examiner

FIG. 1

<bead coating process>

DISPLAY DEVICE AND METHOD FOR FABRICATING REFLECTIVE SHEET FOR THE SAME

CROSS-REFERENCE TO RELATED APPLICATION(S)

This application claims the benefit under 35 U.S.C. §119 (a) of Korean Patent Applications No. 10-2012-0146893, filed on Dec. 14, 2012, and No. 10-2013-0094372, filed on Aug. 8, 2013, in the Korean Intellectual Property Office, the entire disclosure of each of which is incorporated by reference herein for all purposes.

BACKGROUND

1. Technical Field

The following description relates to a display device and a method of fabricating a reflective sheet for the same, and, more particularly, to a display device and a method of manufacturing a reflective sheet for the same in which first and second skin layers of the reflective sheet may be formed to have an embossing surface using a process of manufacturing a reflective sheet fabric alone without a separate bead coating process.

2. Discussion of the Related Art

Liquid crystal display (LCD) devices display an image by adjusting light transmittance of liquid crystals having dielectric anisotropy using an electric field. A liquid crystal display device includes a liquid crystal display panel that includes a thin film transistor substrate and a color filter substrate that are adhered opposite to each other, a backlight unit to emit light to the liquid crystal display panel, and a driving circuit unit for driving the liquid crystal display panel.

The backlight unit includes a light source to generate light, a light guide plate to guide light to the liquid crystal display panel, and a reflective sheet formed on a lower portion of the light guide plate to reflect light toward the liquid crystal display panel.

The reflective sheet is supported by a cover bottom. In this regard, the cover bottom is not flat and thus a load thereof is locally concentrated, which results in adhesion between the reflective sheet and the light guide plate. In addition, light cannot pass through a compressed portion of the light guide plate and thus image blurring in which a dark region is formed occurs.

Figure 1:
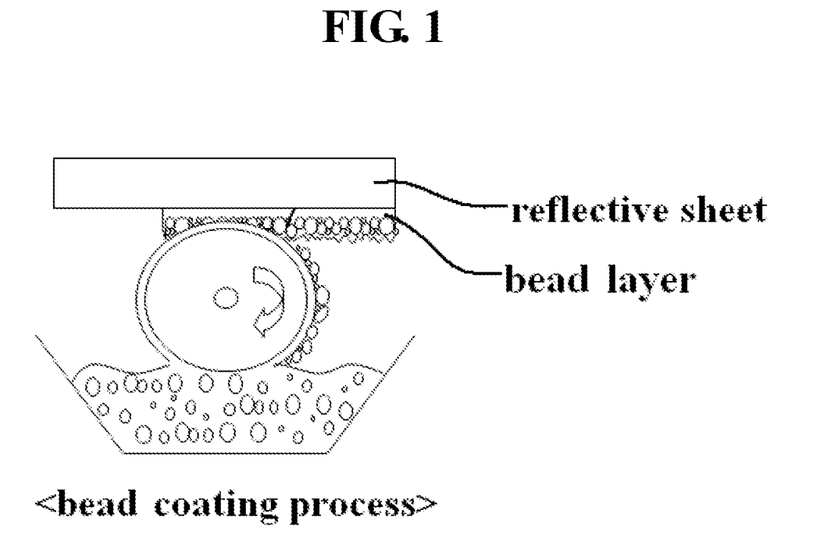
FIG. 1 is a sectional view illustrating a process of coating a conventional reflective sheet with beads.

To prevent adhesion between the reflective sheet and the light guide plate, as illustrated in FIG. 1, the reflective sheet includes bead layers respectively formed on upper and lower portions of the reflective sheet.

The bead layers are formed by forming a reflective sheet through a process of manufacturing a fabric of the reflective sheet and coating the reflective sheet with a bead layer through a bead coating process as illustrated in FIG. 1. That is, a separate bead coating process needs to be performed for formation of bead layers and, accordingly, this method incurs high manufacturing costs and increased manufacturing time.

In this regard, the bead coating process requires process line design and construction costs, manpower, and costs of raw materials such as resin and beads needed in the coating process. These factors are main causes behind a cost increase of the reflective sheet.

SUMMARY

Accordingly, embodiments of the present application are directed to a display device and a method for fabricating a reflective sheet for the same that substantially obviates one or more problems due to the limitations and disadvantages of the related art.

An object of embodiments is to provide a display device and a method of manufacturing a reflective sheet for the same in which first and second skin layers of the reflective sheet may be formed to have an embossing surface using a reflective sheet fabric manufacturing process only without a separate bead coating process.

Advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose according to one aspect of the invention, there is provided a display device, including: a display panel configured to display an image, a plurality of light emitting diodes (LEDs) configured to: generate light, and supply the light to the display panel, a light guide plate configured to guide the light to the display panel, and a reflective sheet configured to reflect light emitted toward a cover bottom disposed below the LEDs toward the light guide plate, the reflective sheet including: a reflective layer, a first skin layer on an upper portion of the reflective layer, and a second skin layer on a lower portion of the reflective layer, wherein the first and second skin layers each include an embossing surface including a plurality of first reflective patterns configured to: prevent adhesion between the reflective layer and the light guide plate, and increase efficiency of light, and wherein the reflective layer includes a plurality of second reflective patterns, each of the second reflective patterns including a filler in an air layer.

In another aspect, there is provided a method of manufacturing a reflective sheet, the method including: preparing a non-oriented film including first and second skin layers, each of the first and second skin layers including a plurality of first reflective patterns and a reflective layer disposed between the first and second skin layers, and including a plurality of second reflective patterns formed of surfactant-coated fillers through a melt-extrusion process, compressing the non-oriented film through a pressing process, and orienting the non-oriented film in machine and transverse directions and heat-treating the oriented film, wherein, when the non-oriented film is oriented, the first and second skin layers are decreased in thickness and include an embossing surface including the first reflective patterns, and wherein the reflective layer includes the second reflective patterns, each of the second reflective patterns including an air layer around a filler.

In another aspect, there is provided a display device, including: a display panel configured to display an image, a plurality of light emitting diodes (LEDs) configured to: generate light, and supply the light to the display panel, a light guide plate configured to guide the light to the display panel, and a reflective sheet configured to reflect light emitted toward a cover bottom disposed below the LEDs toward the light guide plate, the reflective sheet including: a reflective layer, a first skin layer on an upper portion of the reflective layer, and a second skin layer on a lower portion of the reflective layer, wherein the first and second skin layers include an embossing surface configured to: prevent adhesion between the reflective layer and the light guide plate, and increase efficiency of light, and wherein the reflective layer includes a plurality of air bubble layers.

In another aspect, there is provided a method of manufacturing a reflective sheet, the method including: preparing a film including first and second skin layers and a reflective layer disposed between the first and second skin layers through a melt-extrusion process, injecting CO2 gas into the film and forming a plurality of air bubble layers in the reflective layer through a foaming process, forming the first and second skin layers including an embossing surface by pressing the film, and cutting the reflective sheet including the first and second skin layers including an embossing surface using a die cutting process.

It is to be understood that both the foregoing general description and the following detailed description of the present invention are example and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

(FIG. 7(a) is a sectional view of a non-oriented film according to a melt-extrusion process illustrated in FIG. 6. FIG. 7(b) is a sectional view of an oriented film according to an orienting process illustrated in FIG. 6.)

(FIG. 11(a) is a sectional view of a film according to a melt-extrusion process illustrated in FIG. 10. FIG. 11(b) is a sectional view of a film according to a pressing process illustrated in FIG. 10.)

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present invention, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, embodiments will be described in detail with reference to the accompanying drawings in FIGS. 2 to 11.

Figure 2:
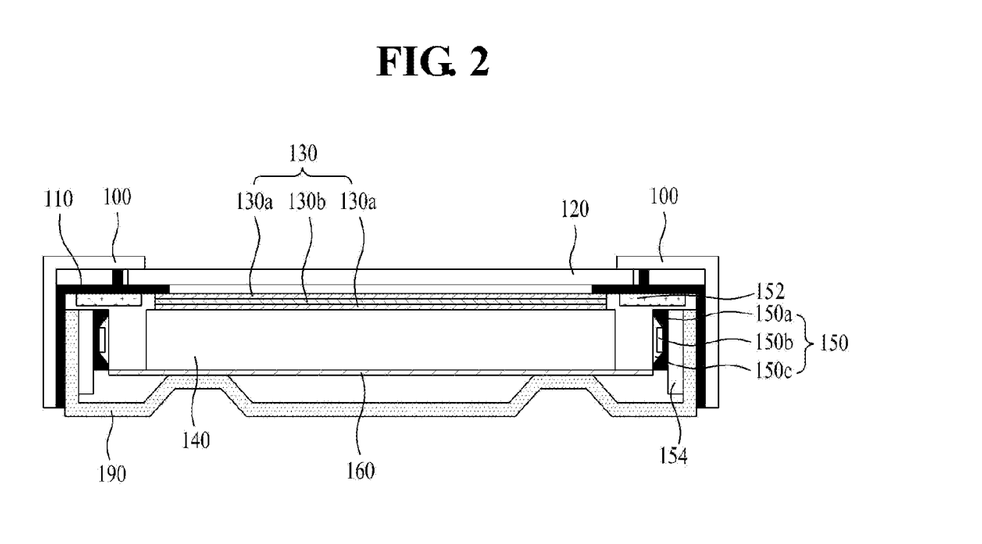
FIG. 2 is a sectional view illustrating a display device according to embodiments.

FIG. 2 is a sectional view of a display device according to an embodiment.

With reference to FIG. 2, the display device according to an embodiment may include a display panel to display an image, a backlight unit to supply light to the display panel, a mold frame 110 to seat the display panel, a top case 100 that may surround an edge region of the display panel and may be coupled to the mold frame 110, and a cover bottom 190 to mount the backlight unit.

The display panel may be, for example, a liquid crystal display (LCD) panel, an organic light-emitting display panel, or the like. A liquid crystal display panel, used as the display panel, will be described by way of example.

The liquid crystal display panel 120 may include a lower substrate including a thin film transistor connected to a gate line and a data line, an upper substrate including color filters to realize colors, a pixel electrode connected to the thin film transistor, and a common electrode to form a vertical electric field or a horizontal electric field together with the pixel electrode.

The color filters may be formed on the upper substrate to divide colors based on a black matrix. The color filters may be formed on the basis of red (R), green (G), and blue (B) to realize red, green, and blue colors.

The common electrode may be formed on a rear surface of the upper substrate as a transparent conductive film to form a vertical electric field together with the pixel electrode, or may be formed on the lower substrate as a transparent conductive film to form a horizontal electric field together with the pixel electrode. A reference voltage, e.g., a common voltage, to drive liquid crystals is applied to the common electrode.

The thin film transistor may be formed on the lower substrate to selectively supply a data signal from the data line to the pixel electrode in response to a gate signal from the gate line. For this operation, the thin film transistor may include a gate electrode connected to the gate line, a source electrode connected to the data line, a drain electrode connected to the pixel electrode, active layers overlapping the gate electrode and a gate insulating film disposed between the active layers to form a channel between the source electrode and the drain electrode, and an ohmic layer to achieve ohmic contact between one of the active layers and the source electrode and between the other thereof and the drain electrode.

The pixel electrode may be independently formed in each of a plurality of pixel regions such that the pixel electrode overlaps the color filters R, G, and B, and may be connected to the drain electrode of the thin film transistor. Upon supply of a data signal through the thin film transistor, the pixel electrode may form a vertical electric field or a horizontal electric field together with the common electrode, to which common voltage may have been applied, such that liquid crystal molecules arranged in a vertical direction may be rotated according to dielectric anisotropy. In addition, transmittance of light passing through the pixel region may be changed based on a rotation degree of the liquid crystal molecules to realize grayscale control.

The liquid crystal panel may be driven in a twisted-nematic (TN) mode in which electrodes may be mounted at two substrates, liquid crystal directors are arranged to be twisted 90 degrees, and a voltage is applied to the electrodes to drive the liquid crystal directors, in an in-plane switching (IPS) mode in which two electrodes may be formed on a substrate and liquid crystal directors are controlled by a horizontal electric field generated between the electrodes, or in a fringe field switching (FFS) mode in which two electrodes may be formed as transparent conductive members and liquid crystal molecules are driven by a fringe field formed between the electrodes disposed such that a distance between the electrodes is small. However, embodiments are not limited to the above examples.

The top case 100 may be fabricated to have a rectangular frame shape with a plane portion bent at a right angle and a side surface portion. The top case 100 may cover the edge region of the liquid crystal display panel 120 and may be coupled to side surfaces of the mold frame 110. Accordingly, the top case 100 may protect the liquid crystal display panel 120 and the backlight unit from external impact and may prevent elements of the display device disposed between the top case 100 and the cover bottom 190 from escaping from the inside of the display device.

The cover bottom 190 may accommodate and support the backlight unit and is coupled with the mold frame 110.

The mold frame 110 may be formed, for example, of a plastic molding material or an aluminum (Al) alloy material, and inner sidewalls of the mold frame 110 may be molded to have stepped surfaces. The liquid crystal display panel 120 may be mounted on the stepped surfaces of the mold frame 110, and the stepped surfaces thereof may prevent movement of the backlight unit and may absorb external impact applied to the backlight unit.

The backlight unit may include a plurality of light emitting diode (LED) packages 150 to generate light, a light guide plate 140 to guide light to the liquid crystal display panel 120, an LED reflector 152, a reflective sheet 160, and an optical sheet unit 130. In this regard, the backlight unit may be of an edge light type or a direct light type depending on an orientation of the LED packages 150 and may supply light to the liquid crystal display panel 120. In the direct light type backlight unit, the LED packages 150 may be disposed at a rear surface of the light guide plate 140 to supply light to the liquid crystal display panel 120. In the edge light type backlight unit, the LED packages 150 may be disposed in a lateral direction of the light guide plate 140 to supply light to the liquid crystal display panel 120. An example in which the LED packages 150 are arranged in a lateral direction of the light guide plate 140 will be described.

The LED packages 150 may be respectively disposed at opposite sides or four sides of the light guide plate 140 in a state of each being mounted on a light source substrate 154. Each LED package 150 may include a main body 150a, an LED 150b disposed at a groove portion of the main body 150a, a lead frame (not shown) electrically connected to the LED 150b via a wire (not shown), and a resin material 150c formed to cover the LED 150b.

The light guide plate 140 may be arranged in a direction in which light is emitted from the LED 150b and thus may uniformly disperse light emitted from the LED 150b into the entire surface of the light guide plate 140 and then may guide the light to the liquid crystal display panel 120. For this operation, the light guide plate 140 may be formed, for example, of polycarbonate that is transparent and heat-resistant or an acryl resin that is transparent and has a high index of refraction. In addition, the light guide plate 140 may be provided at a lower surface thereof with groove portions 142, and efficiency of light emitted from the liquid crystal display panel 120 may be enhanced.

The optical sheet unit 130 may diffuse and focus the light emitted from the light guide plate 140, may increase the perceived luminance of the light, which may result in increased luminous efficiency, and, thereafter, may direct the light to the liquid crystal display panel 120. The optical sheet unit 130 may cause the light emitted from the light guide plate 140 to be incident upon the liquid crystal display panel 120 after focusing the light, and luminous efficiency may be enhanced. For this operation, the optical sheet unit 130 may include at least two diffusion sheets 130a and a prism sheet 130b. The diffusion sheets 130a may focus and diffuse the light emitted from the light guide plate 140, and the prism sheet 130b may focus light emitted from the diffusion sheets 130a. The diffusion sheets 130a may include an upper diffusion sheet 130a disposed at an upper portion of the prism sheet 130b and a lower diffusion sheet 130a disposed at a lower portion of the prism sheet 130b.

The LED reflector 152 may be formed of a reflective material, may be attached to a portion of the mold frame 110 between the light guide plate 140 and the LED package 150, and may reflect light emitted toward the mold frame 110 disposed above the LED packages 150 toward the light guide plate 140.

The reflective sheet 160 may reflect light emitted toward the cover bottom 190 disposed below the LED 150b toward the light guide plate 140. In addition, the reflective sheet 160 may extend to a position corresponding to the LED reflector 152, and may thus reflect the light emitted toward the cover bottom 190 disposed below the LED 150b toward the light guide plate 140.

FIGS. 3A to 3D are sectional views illustrating examples of a reflective sheet of a display device according to an embodiment. The reflective sheet 160 may include a reflective layer 166, a first skin layer 162 formed on an upper portion of the reflective layer 166, and a second skin layer 164 disposed on a lower portion of the reflective layer 166.

As illustrated in FIGS. 3A through 3D, the first and second skin layers 162 and 164 may include a plurality of first reflective patterns 165, and the first reflective patterns may take the form of an embossing surface.

Figure 3A:
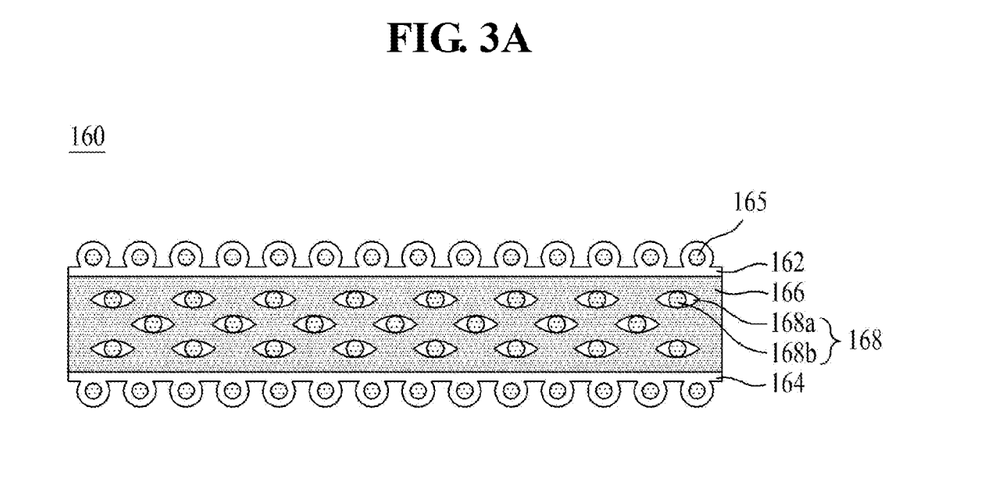
FIGS. 3A to 3D are sectional views illustrating examples of a reflective sheet of a display device according to an embodiment.
Figure 4:
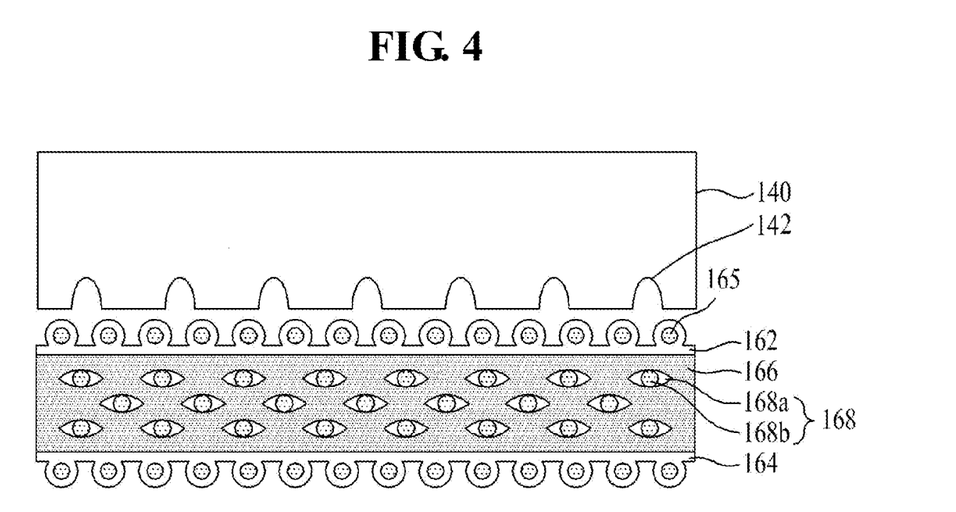
FIG. 4 is a sectional view of the reflective sheet and a light guide plate of a display device according to an embodiment.

As illustrated in FIG. 3A, the first reflective patterns 165 may be formed of an organic filler or an inorganic filler or beads. As illustrated in FIG. 4, an air gap may be formed between the reflective sheet 160 and the light guide plate 140 due to the first reflective patterns 165 in the first skin layer 162, and thus may prevent the reflective sheet 160 from adhering to the light guide plate 140. In addition, light incident upon the reflective sheet 160 may be reflected due to collision with a plurality of fillers or a plurality of beads.

Figure 3B:
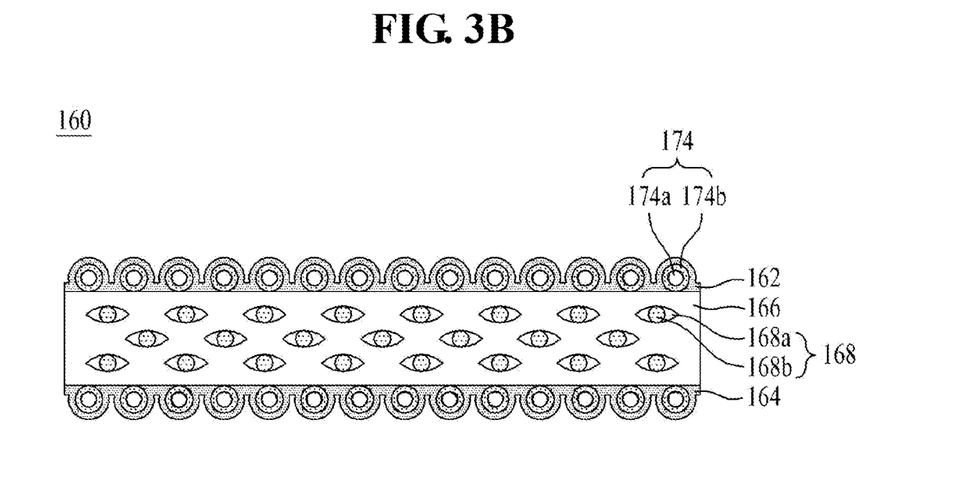

As illustrated in FIG. 3B, hollow fillers 174 may be formed as the first reflective patterns 174. That is, each hollow filler 174 may include a filler 174b formed of an acryl material and an air layer 174a formed in the filler 174b. The hollow fillers 174 may prevent adhesion between the light guide plate 140 and the reflective sheet 160 due to the fillers 174b formed of an acryl material and may enhance reflectance of light due to the air layers 174a inside the respective fillers 174b, which may refract light.

Figure 5:
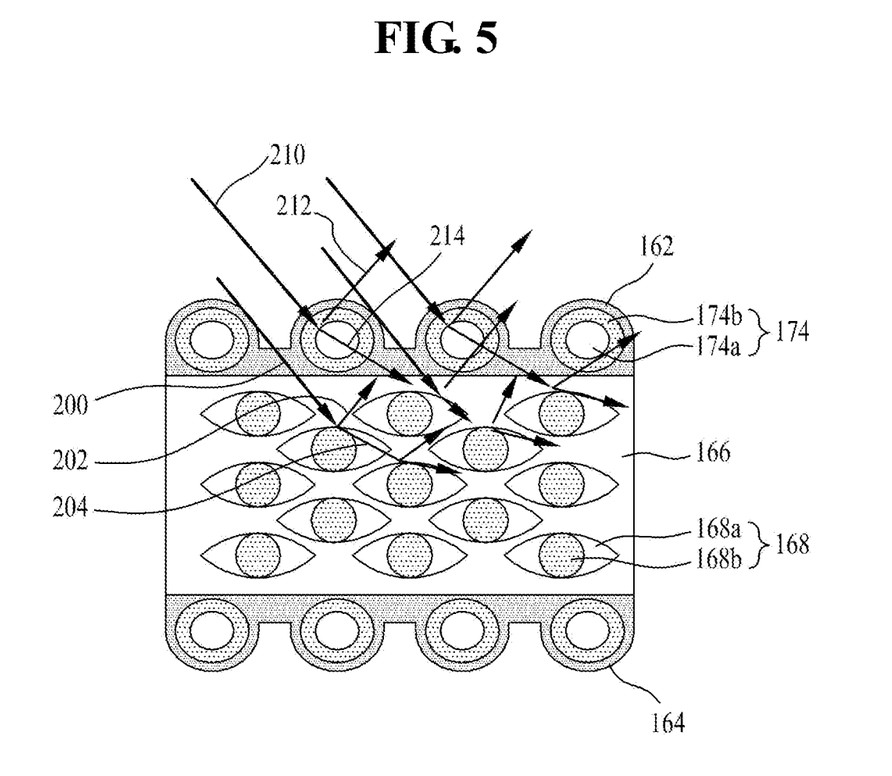
FIG. 5 is a sectional view for explaining light reflection of the reflective sheet of the display device according to the first embodiment.

For example, as illustrated in FIG. 5, some light beams 212 among light beams 210 incident upon the reflective sheet 160 may be reflected due to collision with outer portions of the respective fillers 174b, the remaining light beams 214 may be refracted by the air layers 174a inside the fillers 174b, and the refracted light beams may be reflected or refracted by second reflective patterns 168 inside the reflective layer 166. Thus, the hollow fillers 174 formed in the first skin layer 162 may prevent the reflective sheet 160 from adhering to the light guide plate 140. The first reflective patterns 174 may include hollow fillers and an organic or inorganic material.

Figure 3C:
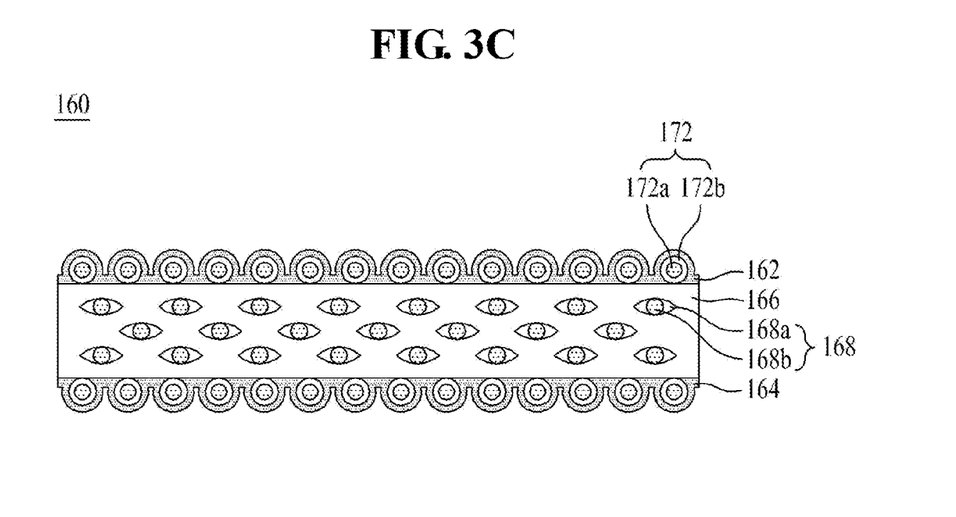

In addition, as illustrated in FIG. 3C, first reflective patterns 172 may include an air layer 172b and a filler 172a formed in the air layer 172b. Accordingly, the surface of the light guide plate 140 and the surface of the reflective sheet 160 may wear out due to friction between the light guide plate 140 and the reflective sheet 160. However, in an embodiment, the light guide plate 140 may contact the air layers 172b, and thus wear of the reflective sheet 160 may be prevented and the weight of the light guide plate 140 may also be supported by the fillers 172a, which may have good rigidity, and contact between the light guide plate 140 and the reflective sheet 160 may be prevented. By forming the first reflective patterns 172 such that the fillers 172a may be included in the air layers 172b, some of the light beams incident upon the reflective sheet 160 may be reflected due to collision with the fillers 172a inside the air layers 172b, the remaining light beams may be refracted by the air layers 172b, and the refracted light beams may be reflected or refracted by the second reflective patterns 168 formed in the reflective layer 166. As illustrated in FIGS. 3B and 3C, reflectance of light may be enhanced by forming the air layers 172b or 174a formed in the first reflective patterns 172 or 174. The first reflective patterns illustrated in FIGS. 3A to 3C may have a size of, for example, 10 μm to 80 μm.

Figure 3D:
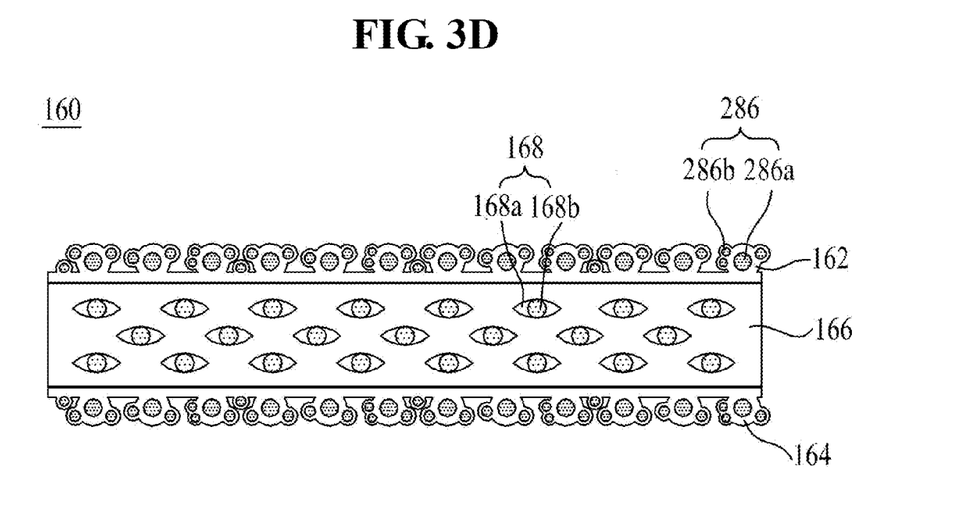

In addition, as illustrated in FIG. 3D, first reflective patterns 286 may have an uneven surface and may include a plurality of first reflective patterns 286a and 286b having different sizes. The first reflective patterns 286a and 286b may be formed of at least two different materials selected from among organic fillers, inorganic fillers, beads, and hollow fillers.

In this regard, as illustrated in FIG. 3D, to maintain a gap between the reflective sheet 160 and the light guide plate 140, the first reflective patterns 286 of the first skin layer 162 may include hollow fillers or beads 286a, which may be rigid fillers, and soft organic or inorganic fillers 286b having a relatively small size and disposed above the hollow fillers or beads 286a, and wear of a contact surface between the light guide plate 140 and the reflective sheet 160 may be prevented and the light guide plate 140 may be supported. For example, the first reflective patterns 286a and 286b included in the first and second skin layers 162 and 164 may be formed such that the organic or inorganic fillers 286b having a smaller size than the hollow fillers or beads 286a are disposed above the beads 286a. In this regard, the organic or inorganic fillers 286b may have a size of, for example, 1 μm to 2 μm, and the hollow fillers or beads 286a may have a size of, for example, 10 μm to 20 μm.

In the reflective layer 166, the second reflective patterns 168 including a filler 168b formed in an air layer 168a may be formed to reflect incident light. For example, as illustrated in FIG. 5, some light beams 202 among light beams 200 having passed between the first reflective patterns 174 may be reflected by the fillers 168b of the second reflective patterns 168 of the reflective layer 166, the remaining light beams 204 of the light beams 200 having passed between the first reflective patterns 174 of the first skin layer 162 may each be refracted by one of the air layers 168a of the second reflective patterns 168, and the refracted light beams 204 may each be reflected or refracted by another one of the air layers 168a of the second reflective patterns 168. As such, reflection and refraction may be repeated, and reflectance of incident light may be enhanced.

As described above, by forming the air layers 168a and the fillers 168b in the reflective layer 166, the light beams incident upon the reflective layer 166 may be repeatedly refracted by the air layers 168a and then the refracted light may be reflected, and the light beams incident upon the reflective layer 166 may also be reflected by the fillers 168b, and reflectance of incident light may be enhanced.

Figure 6:
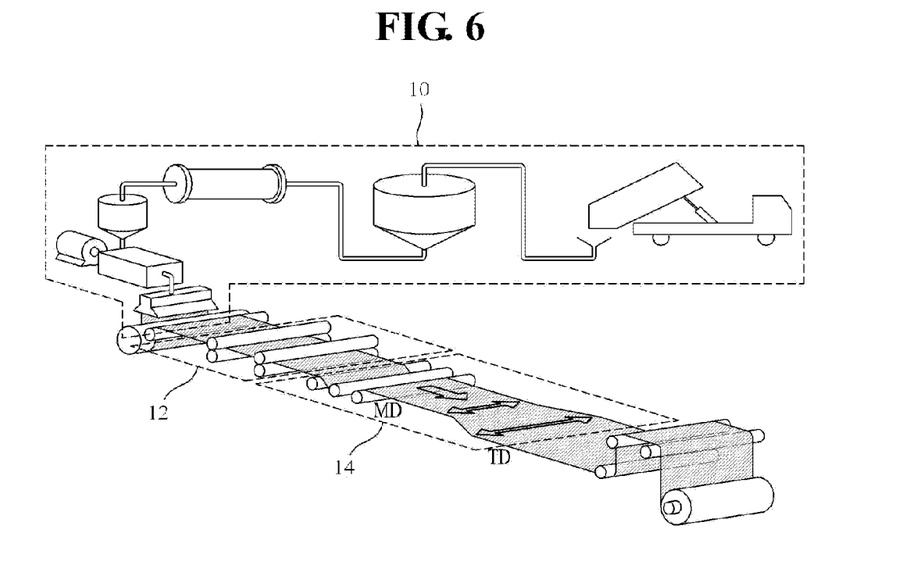
FIG. 6 is a schematic view illustrating a process of manufacturing a fabric of the reflective sheet of the display device according to the first embodiment.
Figure 7:
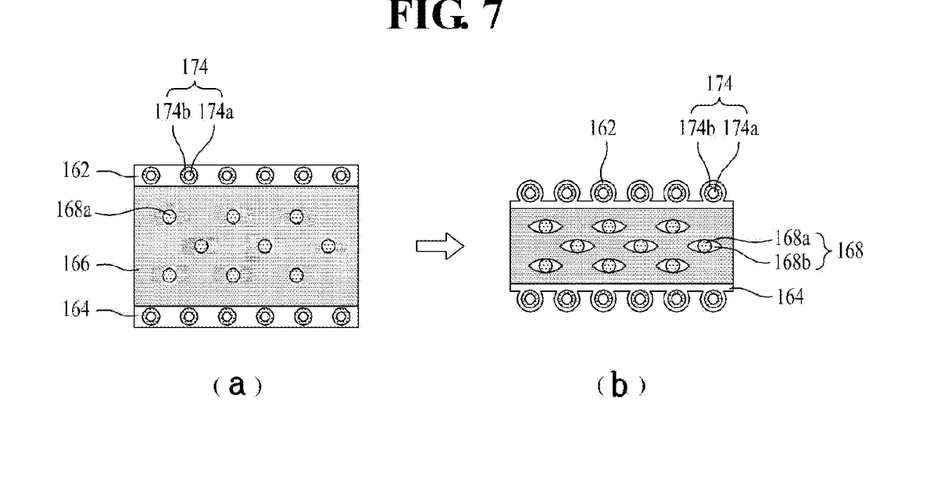
FIG. 7 illustrates sectional views for explaining a method of manufacturing the reflective sheet of a display device according to an embodiment.

FIG. 6 is a schematic view illustrating a process of manufacturing a fabric of the reflective sheet 160 of a display device according to an embodiment. FIG. 7 illustrates sectional views for explaining a method of manufacturing the reflective sheet 166 of a display device according to an embodiment. FIG. 7(a) is a sectional view of a non-oriented film according to a melt-extrusion process illustrated in FIG. 6. FIG. 7(b) is a sectional view of an oriented film according to an orienting process illustrated in FIG. 6.

In the process of manufacturing a fabric of the reflective sheet 160 of the display device according to an embodiment, first, a non-oriented film consisting of the first and second skin layers 162 and 164 (each including the first reflective patterns 174) and the reflective layer 166 (including the second reflective patterns 168 formed between the first and second skin layers 162 and 164) may be prepared through the melt-extrusion process 10. In this regard, the first reflective patterns 174 may be formed of the hollow fillers 174 each including the air layer 174a in the filler 174b formed of an acryl material, and the second reflective patterns 168 may each include the filler 168b coated with a surfactant. In addition, the first reflective patterns 174 may be formed of at least one of organic fillers, inorganic fillers, beads, and surfactant-coated fillers. The non-oriented film formed through the melt-extrusion process 10 is illustrated in the example shown in FIG. 7(a).

Subsequently, the non-oriented film may be compressed through a pressing process 12.

Next, the orienting process may be performed on the non-oriented film in a machine direction (MD) and a transverse direction (TD), and the oriented film may be heat-treated (operation 14).

As illustrated in FIG. 7(b), when the non-oriented film, which may include the first and second skin layers 162 and 164 and the reflective layer 166, is subjected to the orienting process in the machine and transverse directions, the first and second skin layers 162 and 164 may be decreased in thickness and may have an embossing surface by the first reflective patterns 174. At the same time, the reflective layer 166 may be formed to include the second reflective patterns 168 each having the air layer 168a inside the filler 168b.

Hereinafter, a method of forming the second reflective patterns 168 in the reflective layer 166 will be described in detail. While the fillers 168b included in the reflective layer 166 are subjected to the orienting process in the machine and transverse directions, the air layers 268a may each be formed between the filler 168b and the reflective layer 166 due to surfactant coated on an outer surface of each filler 168b. That is, the fillers 168b may not be adhered to the reflective layer 166 due to the surfactant coated on the outer surfaces of the fillers 168b. As such, as there may be no adhesion between the fillers 168b and the reflective layer 166 due to the surfactant, the air layers 168a may be formed around the respective fillers 168b while the film of the reflective layer 166 may be stretched in machine and transverse directions. Simultaneously, through the orienting process, the first and second skin layers 162 and 164 may be decreased in thickness and may have an embossing surface in accordance with the shape of the hollow fillers 174.

In the example described above, the hollow fillers 174 may be formed as the first reflective patterns inside the first and second skin layers 162 and 164, but embodiments are not limited thereto. For example, the first reflective patterns inside the first and second skin layers 162 and 164 may be formed of at least one of organic fillers, inorganic fillers, beads, and surfactant-coated fillers.

When the first reflective patterns inside the first and second skin layers 162 and 164 are formed of organic fillers, inorganic fillers, or beads, the first and second skin layers 162 and 164 may be decreased in thickness by the orienting process and may have an embossing surface in accordance with the shape of the fillers or the beads as illustrated in FIG. 3A and FIG. 3B.

In an example in which the first reflective patterns (e.g., the first reflective patterns 172) inside the first and second skin layers 162 and 164 are formed of surfactant-coated fillers, as illustrated in FIG. 3C, while the first and second skin layers 162 and 164 are stretched in machine and transverse directions, the air layers 172b may be formed between the fillers 172a and the first skin layer 162, the air layers 172b may be formed between the fillers 172a and the second skin layer 164, and first and second skin layers 162 and 164 may have an embossing surface in accordance with the shape of the fillers 172a. In this regard, formation of the air layers 172b between the fillers 172a and the first skin layer 162 and between the fillers 172a and the second skin layer 164 in the stretching process may be attributed to a lack of adhesion between the fillers 172a and the first skin layer 162 and between the fillers 172a and the second skin layer 164 due to the surfactant coated on the outer surfaces of the fillers 172a.

In addition, in an example in which the first reflective patterns 286 of the first and second skin layers 162 and 164 are formed of at least two different materials selected from among organic fillers, inorganic fillers, and beads, as illustrated in FIG. 3D, the soft organic or inorganic fillers 286b may be disposed above the hollow fillers or beads 286a, which may be rigid fillers, while the reflective sheet 160 may be stretched in machine and transverse directions, such that the first and second skin layers 162 and 164 may have an uneven surface by the beads 286a and the fillers 286b. The organic or inorganic fillers 286b formed above the beads 286a may have a size of, for example, 1 μm to 2 μm, and the beads 286a may have a size of, for example 10 μm to 20 μm.

As described above, according to the process of manufacturing the reflective sheet according to an embodiment, the first and second skin layers 162 and 164 may be formed to have an embossing surface by including beads, organic fillers, inorganic fillers, hollow fillers, or surfactant-coated fillers, using the process of manufacturing a fabric of the reflective sheet alone.

Conventionally, bead layers are formed at each of the first and second skin layers through a separate process of coating a reflective sheet with beads in addition to a process of manufacturing a reflective sheet fabric. However, according to the process of manufacturing the reflective sheet according to an embodiment, the first and second skin layers 162 and 164 may be formed to include beads, organic fillers, inorganic fillers, hollow fillers, or surfactant-coated fillers and may also be formed to have an embossing surface using only the process of manufacturing a fabric of the reflective sheet.

Figure 8A:
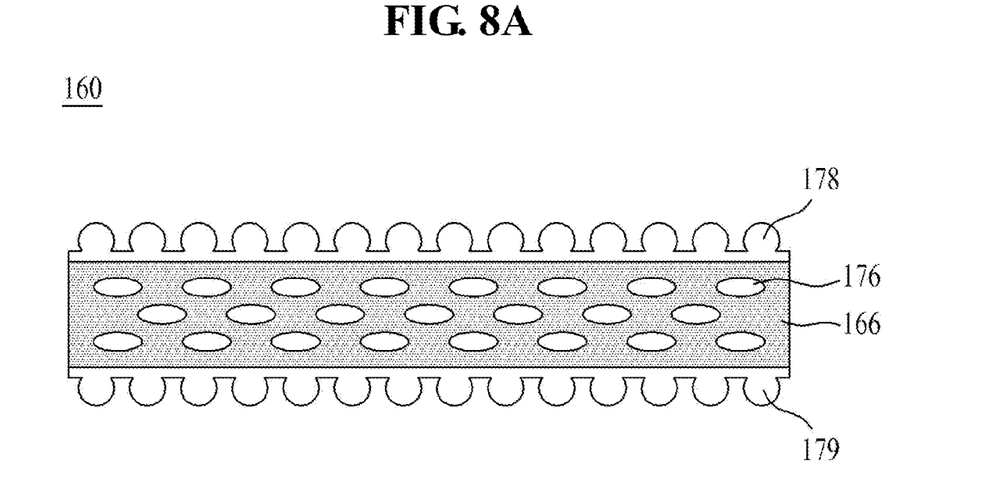
FIGS. 8A through 8C are sectional views illustrating examples of a reflective sheet of a display device according to an embodiment.
Figure 8B:
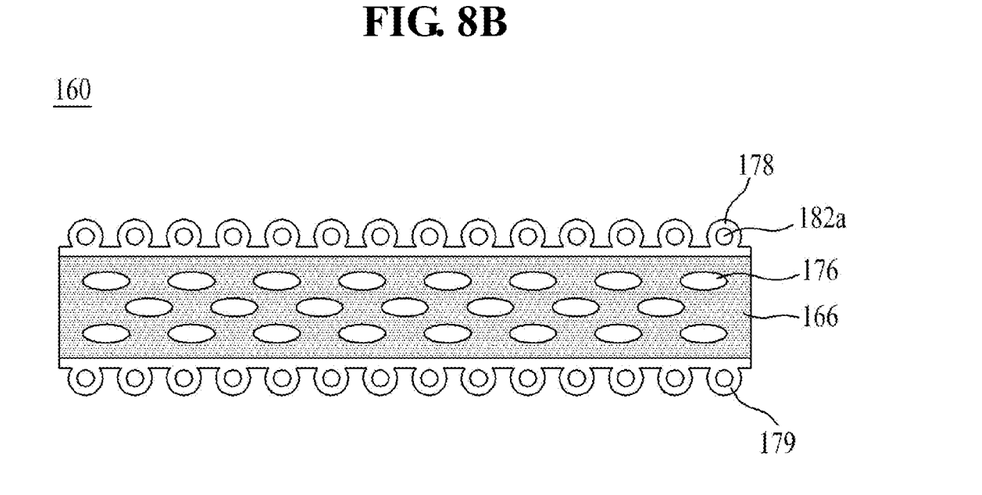
Figure 8C:
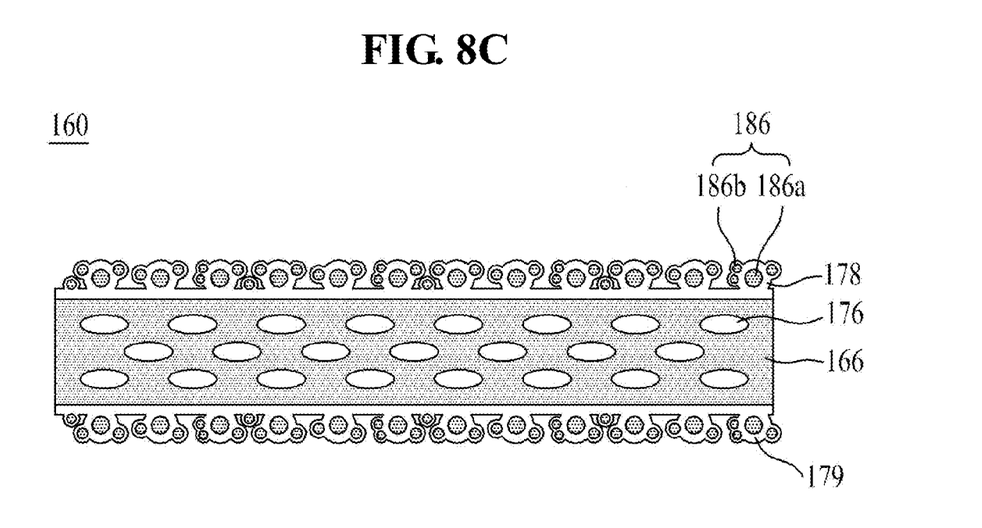

FIGS. 8A through 8C are sectional views illustrating examples of a reflective sheet 160 of a display device according to an embodiment.

Elements of the display device according to an embodiment are the same as those of the display device described above, except that the display devices of some embodiments may include different reflective sheets, and thus, a detailed description of elements other than the reflective sheet is omitted.

The reflective sheet 160 may include the reflective layer 166, a first skin layer 178 formed on an upper portion of the reflective layer 166, and a second skin layer 179 formed on a lower portion of the reflective layer 166.

The first and second skin layers 178 and 179 may be formed to have an embossing surface as illustrated in FIG. 8A. For example, the pattern and surface of the light guide plate 140 and the surface of the reflective sheet 160 may wear due to friction between the light guide plate 140 and the reflective sheet 160. However, in one embodiment, the first and second skin layers 178 and 179 may be formed of a soft material and may have an embossing surface and thus wear of the light guide plate 140 and the reflective sheet 160 may be prevented. In addition, when the first and second skin layers 178 and 179 have an embossing surface, light may be reflected and diffused by the embossing surface thereof, and reflectance of light may be enhanced.

As illustrated in FIG. 8B, the first and second skin layers 178 and 179 may have an embossing surface and may include a plurality of reflective patterns 182a having the same size. In this regard, the reflective patterns 182a may be formed of at least two different materials selected from among organic fillers, inorganic fillers, and beads. The inorganic fillers may be formed of calcium carbonate ($CaCO_3$), silica, or the like, and the organic fillers may be formed of silicon. The organic filler or the inorganic filler may have a size of, for example, 20 μm to 50 μm.

In this regard, to prevent wear between the light guide plate 140 and the reflective sheet 160, the reflective patterns 182a may be formed of organic or inorganic fillers that have high elasticity and are soft, minimizing friction between the light guide plate 140 and the reflective sheet 160. In addition, the reflective patterns 182a may be formed using fillers with relatively high rigidity, e.g., beads, to support the weight of the light guide plate 140 and prevent contact between the light guide plate 140 and the reflective sheet 160.

In an embodiment, as illustrated in FIG. 8C, the first and second skin layers 178 and 179 may have an uneven surface and may include a plurality of reflective patterns 186a and 186b having different sizes. The reflective patterns 186a and 186b may be formed of at least two different materials selected from among organic fillers, inorganic fillers, and beads.

In this regard, as illustrated in FIG. 8C, each first reflective pattern of the first skin layer 178 may include a bead 186a that may be a rigid filler, and fillers 186b that may be formed above the bead 186a, may be formed of a soft organic or inorganic material, and may have a relatively small size, to maintain a gap between the reflective sheet 160 and the light guide plate 140. As such, wear resistance at a contact surface between the light guide plate 140 and the reflective sheet 160 may be improved and the weight of the light guide plate 140 may be supported. As described above, the first reflective patterns included in the first skin layer 178 may be formed such that the organic or inorganic fillers 186b may be smaller than the beads 186a and disposed above the beads 186a. In this regard, the organic or inorganic fillers 286b may have a size of 1 μm to 2 μm, and the beads 286a may have a size of 10 μm to 20 μm.

In addition, as illustrated in FIGS. 8B and 8C, when the first and second skin layers 178 and 179 each have an embossing surface and include the fillers 186b or the beads 186a, light may be reflected and diffused by the embossing surface thereof and the fillers 186b or the beads 186a, and the reflective sheet 160 may have improved light reflectance.

Figure 9:
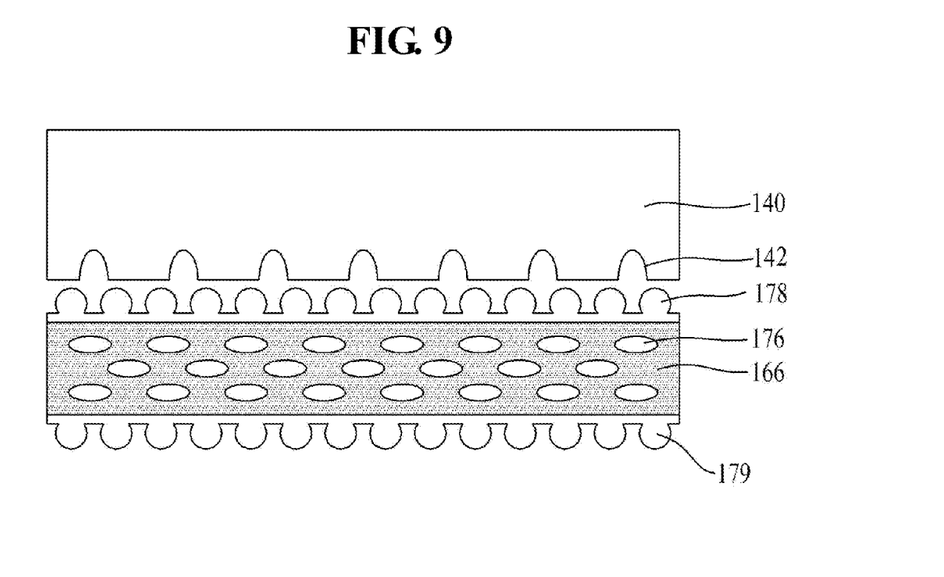
FIG. 9 is a sectional view of the reflective sheet and a light guide plate of a display device according to an embodiment.

The reflective layer 166 may include a plurality of air bubble layers 176 and may reflect incident light. For example, as the air bubble layers 176 may be included in the reflective layer 166, light incident upon the reflective layer 166 may be refracted by one of the air bubble layers 176 and the refracted light may be refracted again by another one of the air bubble layers 176. In such a manner, refraction may be repeated and then the refracted light may be reflected. As such, the air bubble layers 176 may improve reflectance of light. The air bubble layers 176 may have an oval shape having a major axis in a horizontal direction.

Figure 10:
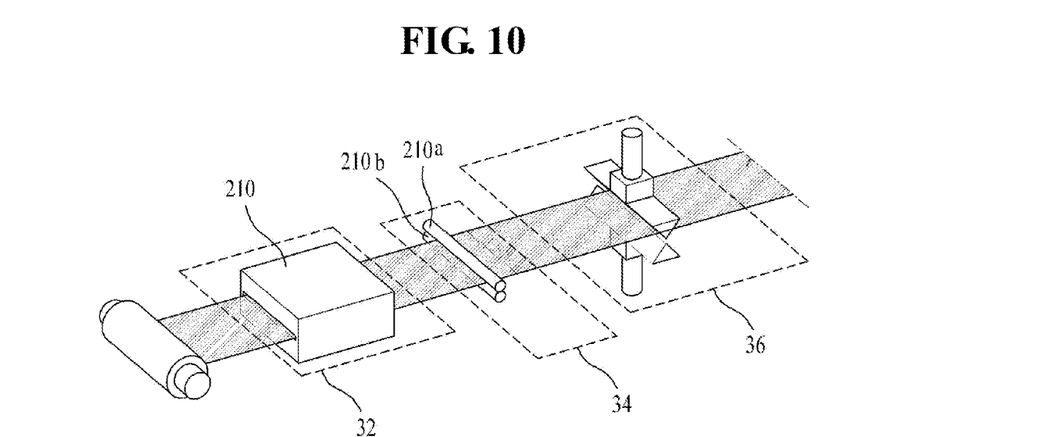
FIG. 10 is a schematic view illustrating a process of manufacturing a fabric of the reflective sheet of a display device according to an embodiment.
Figure 11:
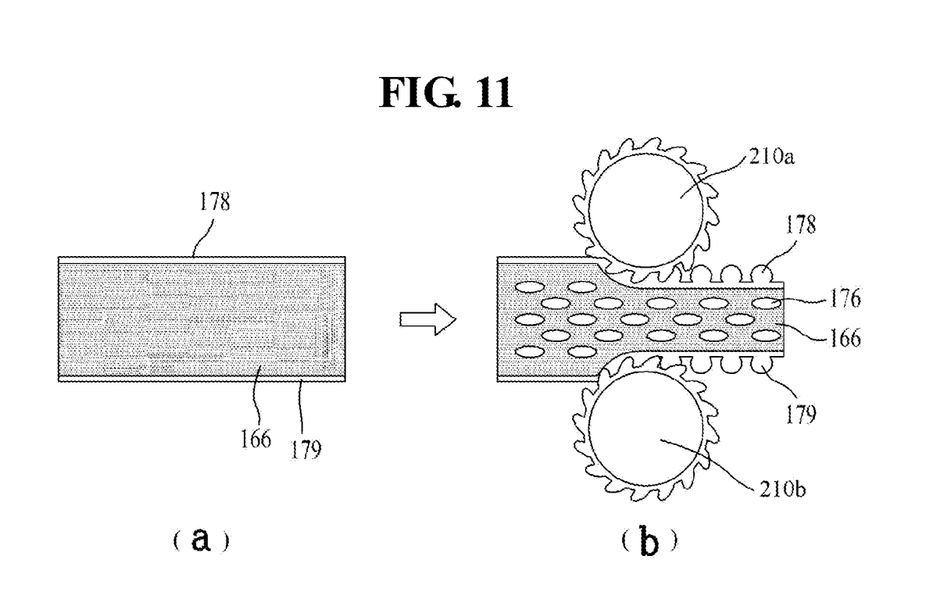
FIG. 11 illustrates sectional views for explaining a method of manufacturing the reflective sheet of a display device according to an embodiment.

FIG. 10 is a schematic view illustrating a process of manufacturing a fabric of the reflective sheet of a display device according to an embodiment. FIG. 11 illustrates sectional views for explaining a method of manufacturing the reflective sheet according to an embodiment. FIG. 11(a) is a sectional view of a film formed according to a melt-extrusion process illustrated in FIG. 10. FIG. 11(b) is a sectional view of a film formed according to a pressing process illustrated in FIG. 10.

In the reflective sheet according to an embodiment, the first and second skin layers 178 and 179 may have an embossing surface, or may have an embossing surface and may also include a plurality of reflective patterns. A method of manufacturing the reflective sheet including the first and second skin layers 178 and 179 having an embossing surface will now be described.

In the method of manufacturing the reflective sheet according to an embodiment, a film including the reflective layer 166, the first skin layer 178 formed on an upper portion of the reflective layer 166, and the second skin layer 179 formed on a lower portion of the reflective layer 166 may be manufactured through a melt-extrusion process. In this regard, the first and second skin layers 178 and 179 may each be formed as a flat film as illustrated in FIG. 11(a), or may include a plurality of reflective patterns. Subsequently, $CO_2$ gas may be injected into the reflective layer 166 of the film formed through the melt-extrusion process.

Thereafter, the $CO_2$ gas-injected film may be subjected to a foaming process to form the air bubble layers 176 in the reflective layer 166 (operation 32). For example, the $CO_2$ gas-injected film may be placed in an oven 210, and the $CO_2$ gas inside the non-oriented film put in the oven 210 may be replaced by air and, as a result, foaming may occur. Accordingly, the air bubble layers 176 may be formed in the reflective layer 166.

Next, the first and second skin layers 178 and 179 of the film may be formed to have an embossing surface through a pressing process 34. For example, as illustrated in FIG. 11(b), the first skin layer 178 may be formed to have an embossing surface while an upper roller 210a having a plurality of protrusions may pass the first skin layer 178. Simultaneously, the second skin layer 179 may be formed to have an embossing surface while a lower roller 210b having a plurality of protrusions may pass the second skin layer 179. Lastly, the reflective sheet including the first and second skin layers 178 and 179 each having an embossing surface may be cut using a die cutting process 36.

As the method of manufacturing the reflective sheet according to an embodiment, a method of manufacturing a reflective sheet including the first and second skin layers 178 and 179 having an embossing surface while also including a plurality of reflective patterns will now be described.

In the method of manufacturing the reflective sheet according to an embodiment, a film including the first and second skin layers 178 and 179 each including the reflective patterns and the reflective layer 166 disposed between the first and second skin layers 178 and 179 may be manufactured through a melt-extrusion process. In this regard, the reflective patterns may have the same size and may be formed of at least two different materials selected from among organic fillers, inorganic fillers, and beads. Alternatively, the reflective patterns may have different sizes and may be formed of at least two different materials selected from among organic fillers, inorganic fillers, and beads. The organic or inorganic fillers may have high elasticity and may be formed of a soft material, and beads may have higher rigidity than the organic or inorganic filler and thus may support the weight of the light guide plate 140, and a gap between the light guide plate 140 and the reflective sheet 160 may be maintained. For example, the inorganic fillers may be formed of, for example, calcium carbonate ($CaCO_3$), silica, or the like, and the organic fillers may be formed of silicon. The organic fillers or the inorganic fillers may have a size of, for example, 20 μm to 50 μm.

Subsequently, a $CO_2$ gas-injected film may be subjected to a foaming process to form the air bubble layers 176 in the reflective layer 166 (operation 32). The $CO_2$ gas-injected film may be placed in the oven 210, and the $CO_2$ gas inside the non-oriented film placed in the oven 210 may be replaced by air and, as a result, foaming may occur. Accordingly, the air bubble layers 176 may be formed in the reflective layer 166 (operation 32).

Thereafter, the first and second skin layers 178 and 179 including the reflective patterns of the film may be formed to have an embossing surface through a pressing process 34. In particular, as illustrated in FIG. 11(b), the first skin layer 178 may be formed to have an embossing surface while the upper roller 210a having a plurality of protrusions may pass the first skin layer 178. Simultaneously, the second skin layer 179 may be formed to have an embossing surface while the lower roller 210b having a plurality of protrusions may pass the second skin layer 179. Accordingly, the first and second skin layers 178 and 179 each having an embossing surface as illustrated in FIG. 8B and including the reflective patterns 182a having the same size may be obtained, or the first and second skin layers 178 and 179 each having an embossing surface as illustrated in FIG. 8C and including a plurality of reflective patterns 186 having different sizes may be obtained.

Lastly, the reflective sheet including the first and second skin layers 178 and 179 each including the reflective patterns 182a or 186 may be cut using a die cutting process 36.

As described above, according to the method of manufacturing the reflective sheet according to an embodiment, the first and second skin layers 178 and 179 may be formed to have an embossing surface or may include fillers or beads.

Conventionally, bead layers may be formed on each of the first and second skin layers through a separate process of coating a reflective sheet with beads in addition to a process of manufacturing a reflective sheet fabric. However, according to the process of manufacturing the reflective sheet according to an embodiment, using the reflective sheet fabric manufacturing process alone without a separate bead coating process, the first and second skin layers 178 and 179 may be formed to have an embossing surface and also include a plurality of fillers or beads.

As apparent from the above description, according to the display device and the method of manufacturing a reflective sheet, according to the present invention, a reflective sheet including first and second skin layers having an embossing surface by a plurality of reflective patterns may be formed using an orienting step of the reflective sheet fabric manufacturing process. As such, the reflective sheet including first and second skin layers having an embossing surface in accordance with the shape of a plurality of reflective patterns may be formed using only the reflective sheet fabric manufacturing process without a separate bead coating process.

According to the display device and the method of manufacturing a reflective sheet, a reflective sheet including first and second skin layers having an embossing surface may be formed through a pressing of the reflective sheet fabric manufacturing method. As such, the reflective sheet including first and second skin layers having an embossing surface may be formed using only the reflective sheet fabric manufacturing process without a separate bead coating process.

As described above, by forming the reflective sheet including first and second skin layers having an embossing surface using the reflective sheet fabric manufacturing process only, costs for the bead coating process, such as manufacturing equipment costs, labor costs, raw material costs, and the like may be reduced.

In addition, as the first and second skin layers of the display device may be formed to have an embossing surface by a plurality of first reflective patterns, adhesion between the light guide plate and the reflective sheet may be prevented and reflective efficiency of light may also be enhanced. In addition, a plurality of second reflective patterns each having a filler in an air layer may be formed in a reflective layer, and reflective efficiency of light may be enhanced.

Moreover, first and second skin layers of the display device may be formed to have an embossing surface and thus adhesion between the light guide plate and the reflective sheet may be prevented and reflective efficiency of light may also be enhanced. In addition, a plurality of air bubble layers may be formed in the reflective layer, and reflective efficiency of light may be improved.

Although embodiments have been described with reference to a number of illustrative embodiments thereof, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a display panel configured to display an image;
a plurality of light emitting diodes (LEDs) configured to:
generate light; and
supply the light to the display panel;
a light guide plate configured to guide the light to the display panel; and
a reflective sheet configured to reflect light emitted toward a cover bottom disposed below the LEDs toward the light guide plate, the reflective sheet comprising:
a reflective layer;
a first skin layer on an upper portion of the reflective layer; and
a second skin layer on a lower portion of the reflective layer,
wherein the first and second skin layers each comprise an embossing surface comprising a plurality of first reflective patterns configured to:
prevent adhesion between the reflective layer and the light guide plate, and
increase efficiency of light, and
wherein the reflective layer comprises a plurality of second reflective patterns, each of the second reflective patterns comprising a filler in an air layer.

2. The display device of claim 1, wherein the first reflective patterns comprise organic or inorganic fillers or beads.

3. The display device of claim 1, wherein each of the first reflective patterns comprises a filler in an air layer.

4. The display device of claim 1, wherein the first reflective patterns comprise hollow fillers each comprising an air layer in a filler.

5. The display device of claim 2, wherein the first reflective patterns comprise a size of 10 μm to 80 μm.

6. A display device, comprising:
a display panel configured to display an image;
a plurality of light emitting diodes (LEDs) configured to:
generate light; and
supply the light to the display panel;
a light guide plate configured to guide the light to the display panel; and
a reflective sheet configured to reflect light emitted toward a cover bottom disposed below the LEDs toward the light guide plate, the reflective sheet comprising:
a reflective layer;
a first skin layer on an upper portion of the reflective layer; and
a second skin layer on a lower portion of the reflective layer,
wherein the first and second skin layers comprise an embossing surface configured to:
prevent adhesion between the reflective layer and the light guide plate, and
increase efficiency of light, and
wherein the reflective layer comprises a plurality of air bubble layers.

7. The display device of claim 6, wherein the first and second skin layers each comprise:
an embossing surface; and
a plurality of reflective patterns.

8. The display device of claim 7, wherein the reflective patterns comprise:
a same size; and
at least two different materials selected from among organic fillers, inorganic fillers, and beads.

9. The display device of claim 7, wherein the reflective patterns comprise:
different sizes; and
at least two different materials selected from among organic fillers, inorganic fillers, and beads.

10. The display device of claim 9, wherein the reflective patterns are configured such that the organic or inorganic fillers are formed above the beads.

11. The display device of claim 8, wherein the inorganic fillers comprise calcium carbonate ($CaCO_3$) or silica.

12. The display device of claim 8, wherein the organic fillers comprise silicon.

\* \* \* \* \*